Dec. 8, 1953  B. E. STOKES  2,661,958
WHEEL AND AXLE ASSEMBLY FOR TOBACCO TRUCK CHASSIS
Filed July 11, 1952  2 Sheets-Sheet 1
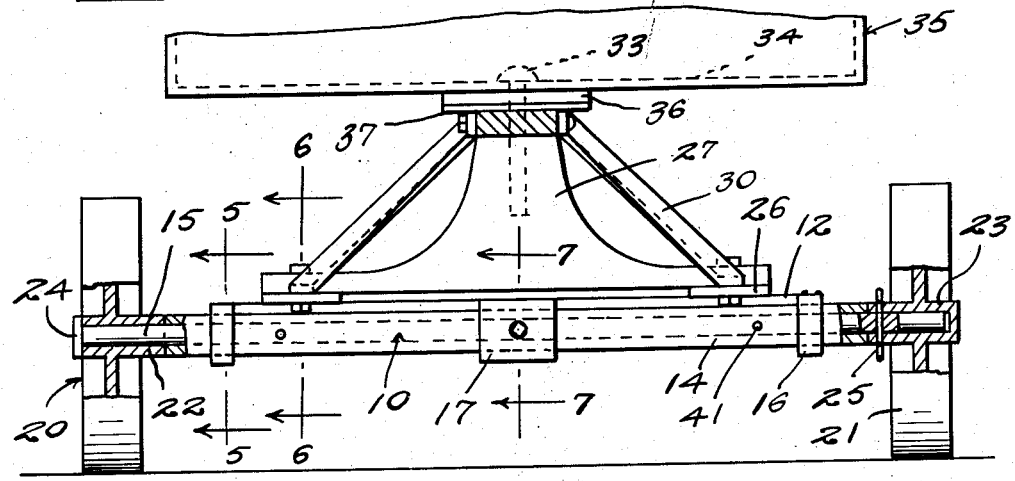
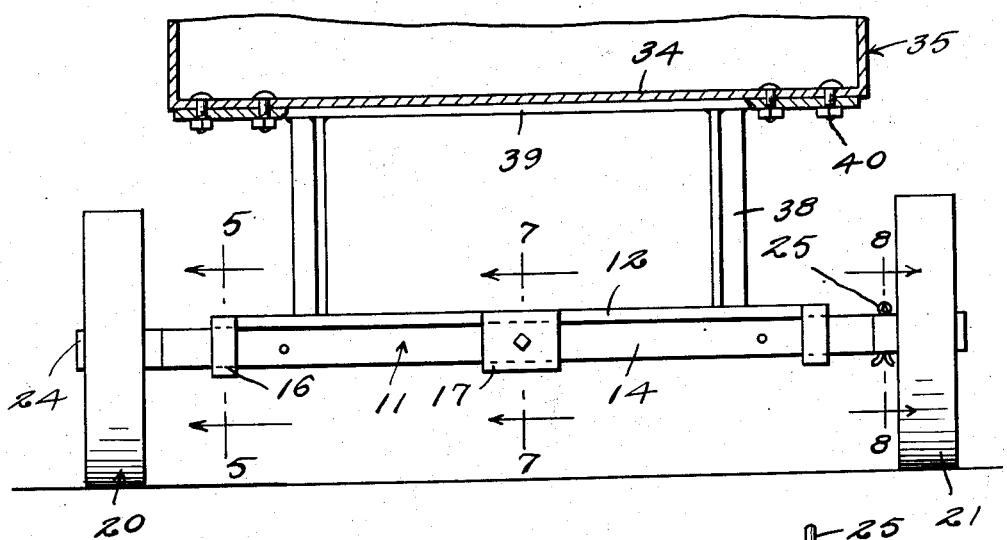
INVENTOR
Benjamin E. Stokes
BY Kimmel & Crowell
ATTORNEYS Dec. 8, 1953  B. E. STOKES  2,661,958
WHEEL AND AXLE ASSEMBLY FOR TOBACCO TRUCK CHASSIS
Filed July 11, 1952  2 Sheets-Sheet 2
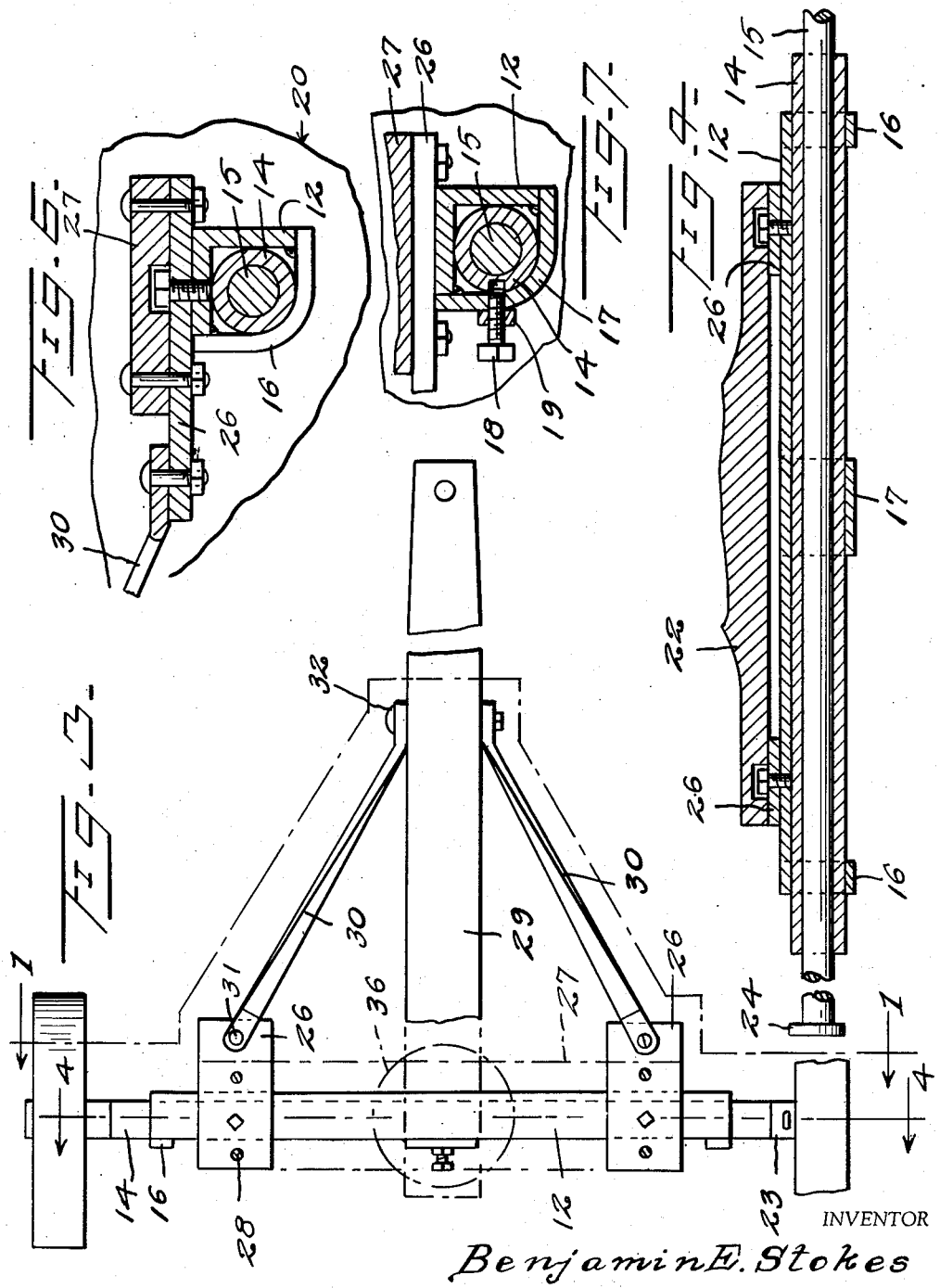
INVENTOR
Benjamin E. Stokes
BY Kimmel & Crowell
ATTORNEYS Patented Dec. 8, 1953

2,661,958

UNITED STATES PATENT OFFICE 2,661,958

WHEEL AND AXLE ASSEMBLY FOR TOBACCO TRUCK CHASSIS

Benjamin E. Stokes, Ayden, N. C.

Application July 11, 1952, Serial No. 298,221

1 Claim. (Cl. 280—29)

This invention relates to an improved tobacco truck or carrier.

An object of this invention is to provide in a tobacco truck an improved bearing means for the wheel axles whereby the axles and bearings can be readily assembled and renewed or repaired.

Another object of this invention is to provide an axle assembly which is so constructed that the axle may be pulled by removal of a single cotter pin, and the axle bearing may be removed by removal of a single set screw.

A further object of this invention is to provide an improved chassis for a tobacco truck which includes front and rear bolsters with an improved means for mounting the axles to the bolster.

With the above and other objects in view, my invention consists in the arrangement, combination and details of construction disclosed in the drawings and specification, and then more particularly pointed out in the appended claim.

In the drawings—

Figure 1 is a sectional view taken on the line 1—1 of Figure 3,

Figure 2 is a vertical section of the rear portion of a tobacco truck,

Figure 3 is a fragmentary plan view of the front bolster and drawbar,

Figure 4 is a fragmentary sectional view taken on the line 4—4 of Figure 3,

Figure 5 is a sectional view taken on the line 5—5 of either Figure 1 or 2,

Figure 6 is a sectional view taken on the line 6—6 of Figure 1,

Figure 7 is a fragmentary sectional view taken on the line 7—7 of either Figure 1 or 2, Figure 8 is a sectional view taken on the line 8—8 of Figure 2.

Referring to the drawings, the numerals 10 and 11 designate generally front and rear axle assemblies on which front and rear bolsters are adapted to be secured as will be hereinafter described. The front and rear axle assemblies are of like construction and each axle assembly is formed of an elongated angle member 12 having mounted in an angle thereof an elongated sleeve 14. The sleeve 14 is longer than the angle member 12, and a shaft 15 is rotatably mounted in the sleeve or bearing member 14.

The sleeve 14 is removably held in an angle of the angle member 12 by means of a pair of end strap members 16 and an intermediate strap member 17. The strap members 16 are welded or otherwise fixed to the adjacent edges of the angle member 12 and engage about the sleeve 14, as shown in Figures 6 and 7. The sleeve 14 is held against endwise and rotary movement by means of a set screw 18 which is threaded through the intermediate strap or plate 17 and is extended at least partly into the sleeve 14. The set screw 18 is locked by means of a lock nut 19.

A pair of wheels 20 and 21 are mounted on the opposite ends of the shaft 15 and each wheel is formed with a cylindrical hub 22 and 23 respectively. One end of the shaft 15 is provided with a head 24 bearing against the outer end of the hub 22 and the inner end of the hub 22 bears against the outer end of the bearing sleeve 14. Hub 23 bears against the outer end of sleeve 14 and a cotter pin 25 is extended through hub 23 and through the shaft 15 so as to lock wheel 21 relative to shaft 15. Wheel 20 is free to rotate on shaft 15.

The front axle assembly has secured to the angle member 12 thereof a pair of spaced apart plates 26 and an upstanding bolster 27 is secured by fastening means to the plates 26. A drawbar 29 engages the upper end of the bolster 27 and a pair of upwardly and forwardly convergent bracing bars 30 are secured at their rear ends to the plates 26 by fastening means 31 and are secured at their forward convergent ends to the drawbar 29 by fastening means 32.

A pivot pin 33 is adapted to be extended through the bottom wall 34 of a carrier body 35 and through a fifth wheel 36. The fifth wheel 36 engages a complementary plate 37 disposed on the upper side of the drawbar 29.

The rear axle assembly 11 has secured to the angle member 12 thereof a pair of upstanding angle bars 38 and a horizontally disposed plate 39 is secured as by welding or the like to the upright bars 38. The horizontal upper bar 39 is secured to the bottom 34 of the body 35 by means of pairs of bolts or fastening members 40.

In the use of this truck structure, the front and rear bolsters are secured to the body 35 and the device is pulled along the ground in the conventional manner. When it is desired to remove a bearing sleeve 14 or a shaft 15, cotter pin 25 is withdrawn and set screw 18 is loosened. Bearing sleeve 14 may then be freely pulled from the angle of the angle member 12 and from the straps 16 and 17. Each bearing sleeve 14 is provided with two or more lubricating openings or fittings 41 so that shaft 15 can be properly lubricated.

I do not mean to confine myself to the exact details of construction herein disclosed, but claim all variations falling within the purview of the appended claim.

What I claim is:

An axle and wheel assembly comprising an elongated horizontal angle member, a bearing sleeve engaging in the angle of said member and projecting beyond the ends of said member, a pair of end straps and an enlarged center strap fixed to said member and extending about said sleeve, a set screw threaded through said center strap and engaging said sleeve for holding the latter against endwise and rotary movement, a shaft rotatable in said sleeve and projecting beyond the ends thereof a wheel on one end of said shaft, a wheel retaining head on said one end of said shaft, said wheel having a hub abutting against one end of said sleeve, a second wheel on the other end of said shaft, said second wheel having a hub abutting against the other end of said sleeve, and a pin extending through said second hub and said shaft to thereby lock said second wheel relative to said shaft.

BENJAMIN E. STOKES.

References Cited in the file of this patent

UNITED STATES PATENTS

| Number | Name | Date |
| --- | --- | --- |
| 318,118 | Jacobs | May 19, 1885 |
| 473,189 | Hoeffler | Apr. 19, 1892 |
| 1,125,432 | Alexander | Jan. 19, 1915 |
| 1,785,717 | Adams | Dec. 16, 1930 |
| 2,373,412 | Plecki | Apr. 10, 1945 |